COMBINED ENCODER AND DECODER SYSTEM

Filed Aug. 3, 1954 5 Sheets-Sheet 1

INVENTORS
DONALD F. MAYER
JOSEPH C. UHLAND
BY
Brown, Denk & Synnestvedt
AGENTS

INVENTORS
DONALD F. MAYER
JOSEPH C. UHLAND
BY
Brown, Denk & Synnestvedt
AGENTS

INVENTORS
DONALD F. MAYER
JOSEPH C. UHLAND
BY Brown, Jenks & Synnestvedt
AGENTS

COMBINED ENCODER AND DECODER SYSTEM

INVENTORS
DONALD F. MAYER
JOSEPH C. UHLAND
BY
Brown, Jenk & Synnestvedt
AGENTS

COMBINED ENCODER AND DECODER SYSTEM

Filed Aug. 3, 1954

INVENTORS
DONALD F. MAYER
JOSEPH C. UHLAND
BY
Brown, Denk & Synnestvedt
AGENTS 2,950,348

COMBINED ENCODER AND DECODER SYSTEM

Donald F. Mayer, Philadelphia, Pa., and Joseph C. Uhland, Camden, N.J., assignors to Philco Corporation, Philadelphia, Pa., a corporation of Pennsylvania Filed Aug. 3, 1954, Ser. No. 447,477

10 Claims. (Cl. 178—43.5)

This invention relates to signal transmission systems and more particularly to a combined encoder-decoder circuit for pulse code type signal transmission systems.

It is sometimes necessary to convert electrical signals representing speech, music or the like to a different type of signal in order to provide privacy of conversation, for more efficient use of the frequency spectrum or for other reasons. One system now in current use replaces the original electrical signal with a different electrical signal in the form of a series of pulse code groups. Each code group indicates by its composition the amplitude of the original signal at a preselected sampling time. The sampling rate, and hence the rate at which the code groups occur, is usually chosen to be approximately twice the highest frequency to be transmitted by the system. The number of pulses and their arrangement in a code group will depend upon the number of amplitude levels to be recognized or reproduced by the system. A four pulse code group, in which the presence of a pulse represents a one and the absence of a pulse represents a zero in a binary notation, will permit 16 amplitude levels to be represented. For example, a four pulse code group in which the first and third pulses were absent would represent the binary number 0101 which corresponds to the decimal level 5. If the presence of a pulse represented a zero in the binary number instead of a one, the above binary number would become 1010 which corresponds to the decimal level 10. 16 levels are ordinarily enough to reproduce speech with the fidelity normally present over a good telephone circuit. However, music and very high fidelity speech transmission may require code groups of five or six pulses which can represent, respectively, 32 or 64 amplitude levels.

Various systems have been proposed for converting the original signal into a coded signal and then reconverting the coded signal into a signal resembling the original signal. In many of these systems there is either much duplication of parts in the encoder and decoder circuits or the two circuits are entirely dissimilar in their operation. In either case the considerable circuitry that is required by the prior art systems is a disadvantage where weight and space is a factor, for example in aircraft or other moving vehicles. Also, unless information is to be received and transmitted simultaneously at any one location, the encoder remains idle while the decoder is in operation and vice versa.

Therefore it is an object of the present invention to provide a novel circuit that will function either as an encoder or as a decoder for binary pulse code transmission systems.

It is a further object of the invention to provide a combined encoder-decoder circuit in which the amount of idle equipment in either mode of operation is at a minimum.

Another object of the invention is to provide a combined encoder-decoder circuit which can be switched from one mode of operation to another simply by altering the electrical potentials applied to selected points in the circuit.

The circuit by which these and other objects of the invention are realized comprises, generally, a source of reference potential which periodically normally increases or decreases in amplitude in a series of progressively smaller steps each time a code group is to be generated. Means are provided for sampling the signal to be encoded at times just preceding this change in amplitude of the reference potential. The sampling means provides a signal which remains at a substantially constant amplitude during the interval in which the reference potential is changing in amplitude. Further means are provided for comparing the amplitude of the signal from the sampling means with each of the various levels of the reference potential. Means responsive to the output signal of the comparing circuit generates a pulse of the code group if the sampled signal exceeds the reference signal. If a pulse is generated, the next following decrease in the reference potential is changed to an increase. In this way the amplitude of the reference potential is caused to approach the amplitude of the signal from the sampling means by a series of approximations. The presence or absence of a pulse at a particular position in the code group indicates whether the corresponding approximation resulted in an amplitude of the reference level which was too small or too large.

To decode a signal, the signal to be decoded is supplied to the means controlling the amplitude of the reference potential. A pulse in the signal to be decoded causes an increase in the reference signal level. Means are provided for sampling the finally attained amplitude of the reference potential at a time following the normal time of occurrence of the last pulse in a code group. Filter means are provided for converting the last-mentioned sample signals to a signal resembling the original signal represented by the coded signal.

For a better understanding of the invention reference should now be made to the following detailed description which is to be read in conjunction with the accompanying drawings in which.

Figure 2:
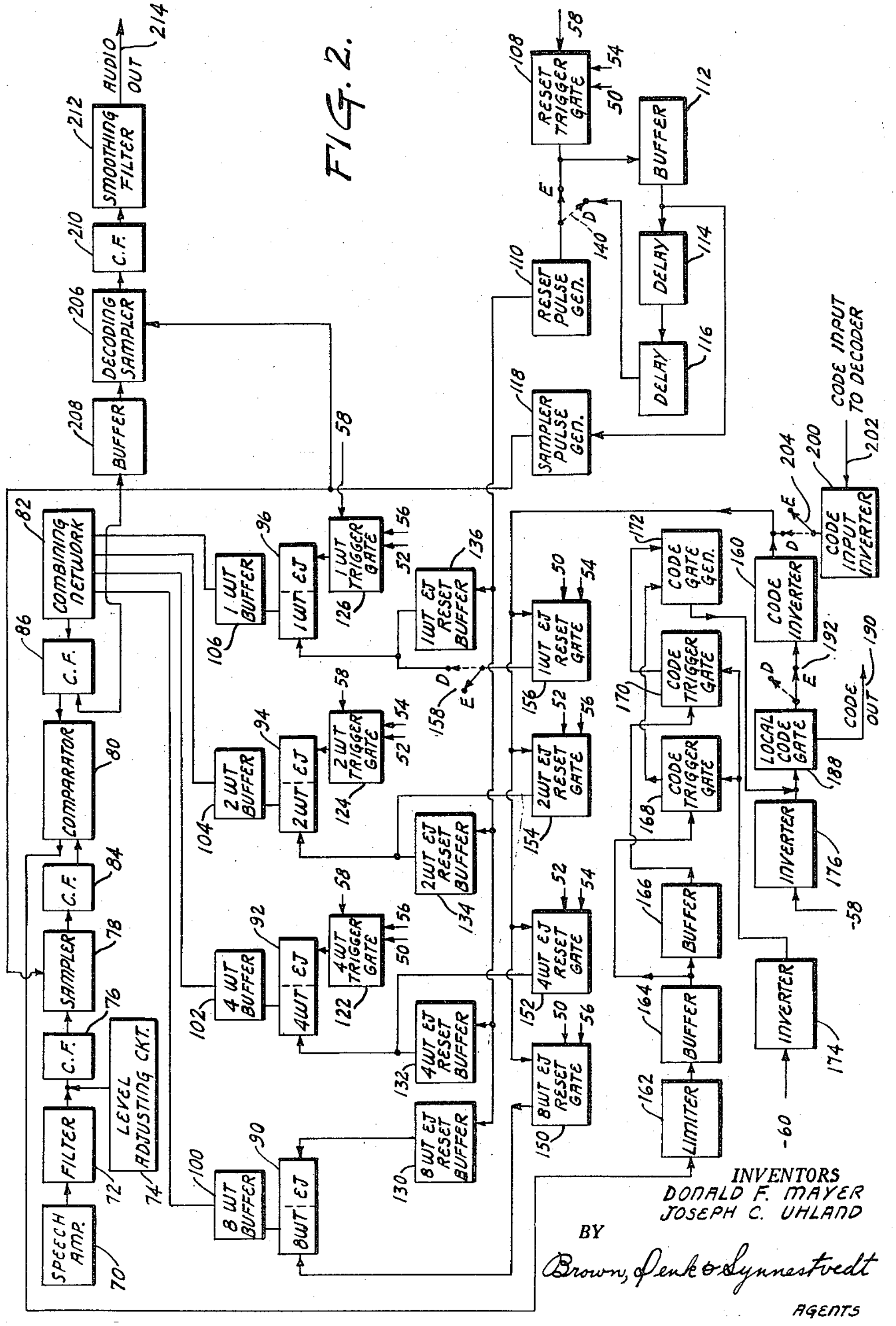
Fig. 2 is a block diagram of a preferred embodiment of the invention.
Figure 3A:
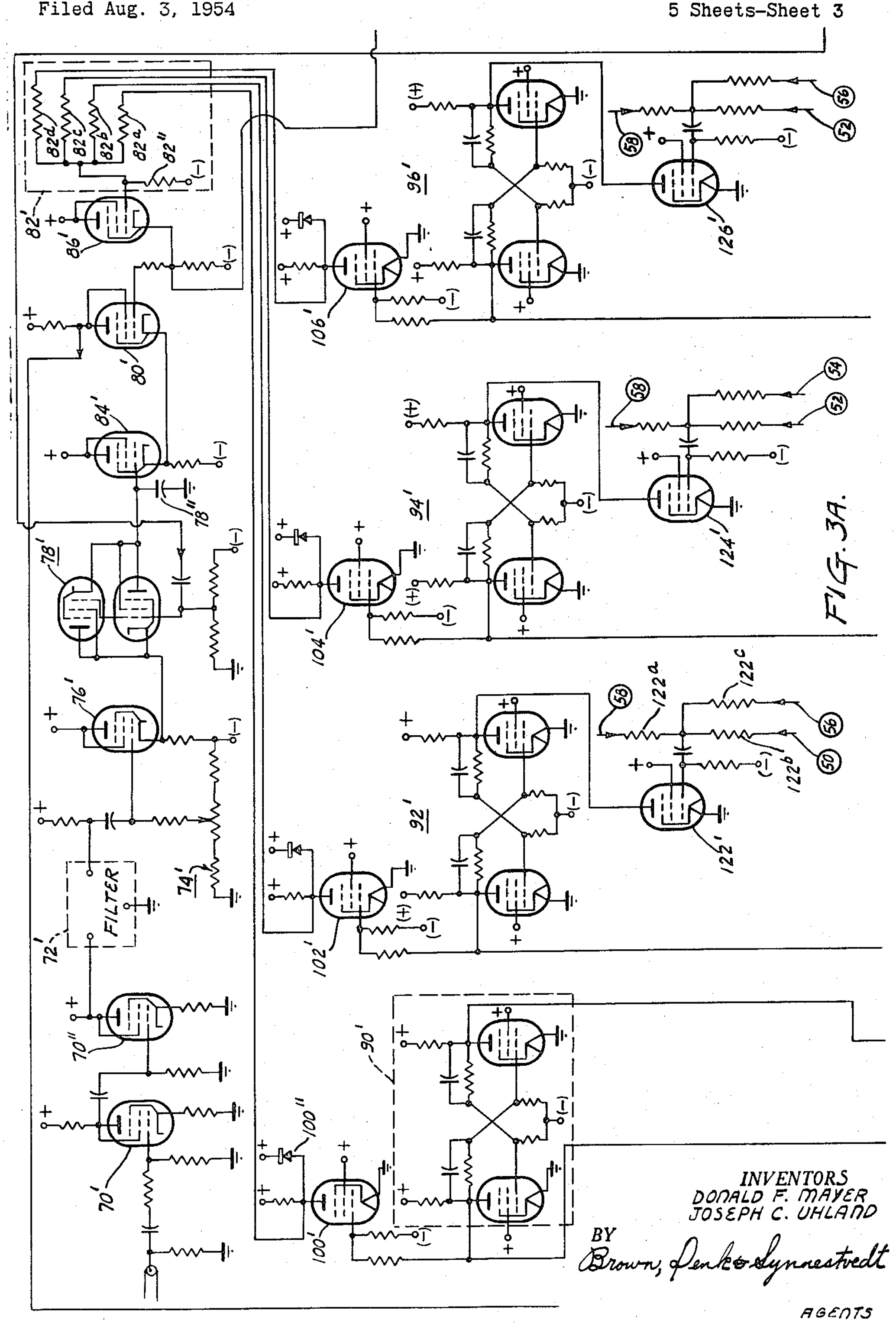
Figure 3B:
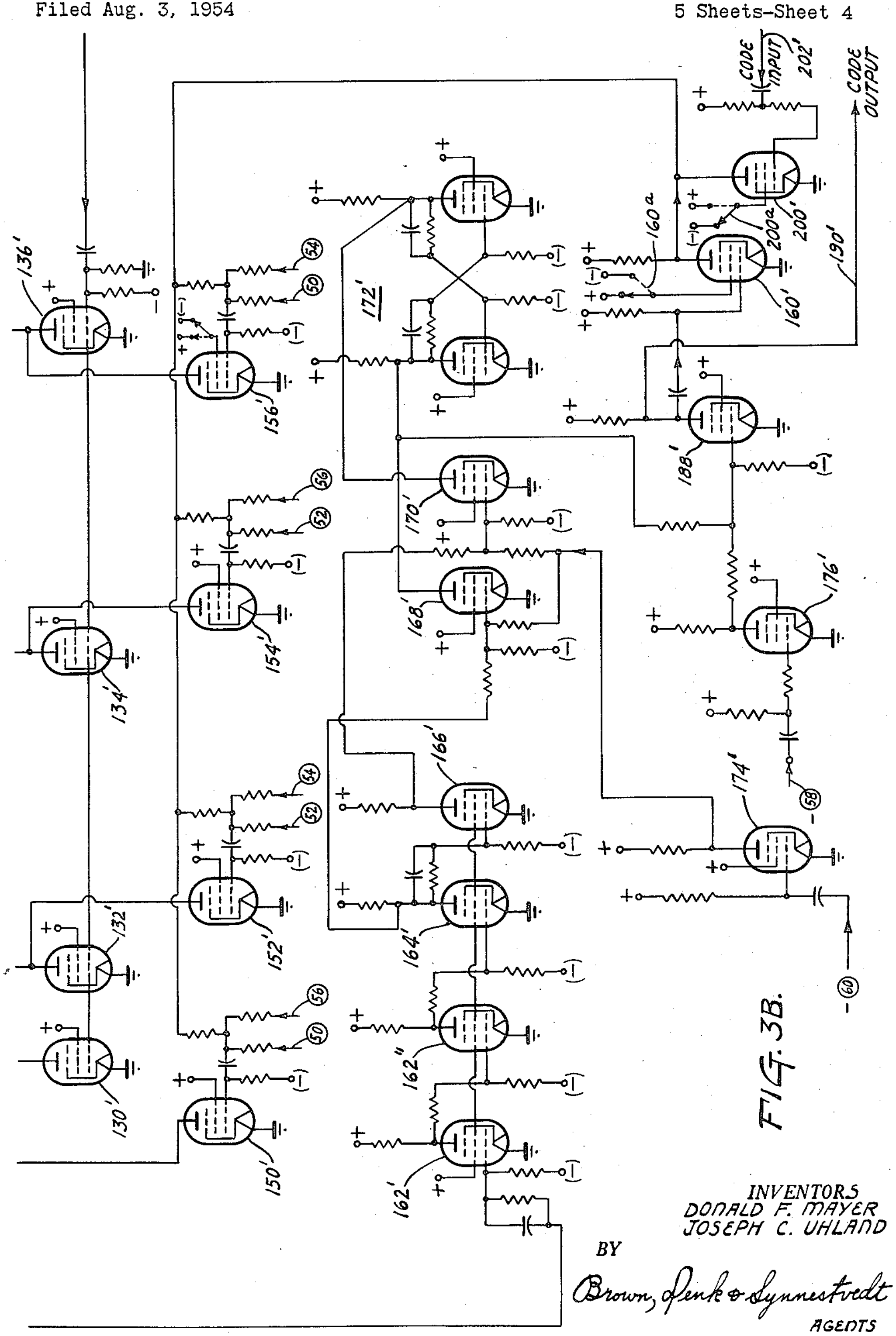
Figure 3C:
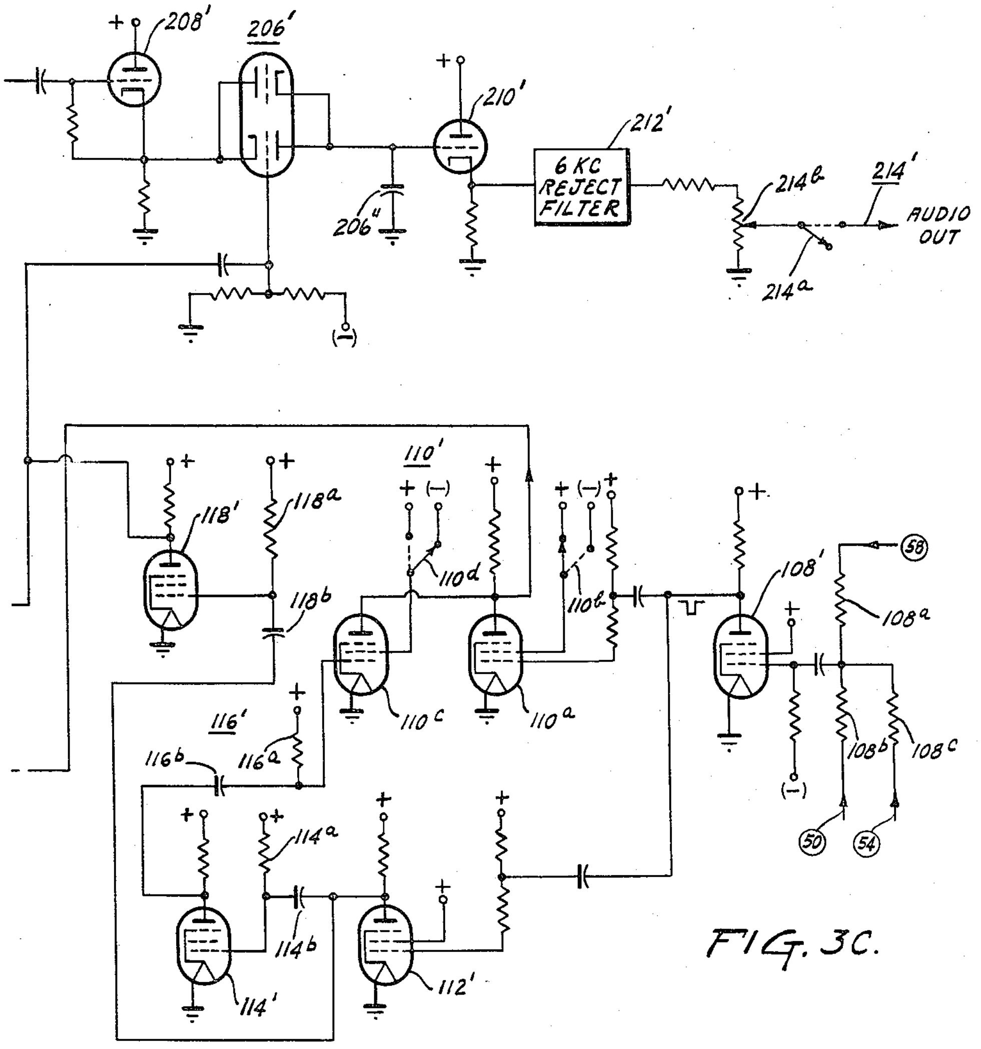
Figure 4:
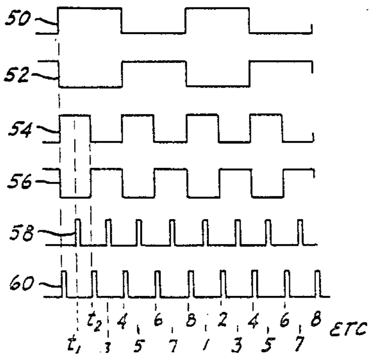

Figs. 3A, 3B and 3C together form a schematic diagram of a system similar to the one shown in block form in Fig. 2; and Fig. 4 is a series of waveforms illustrating certain time relationships which are of importance in understanding the operation of the systems of Figs. 2 and 3.

Figure 1:
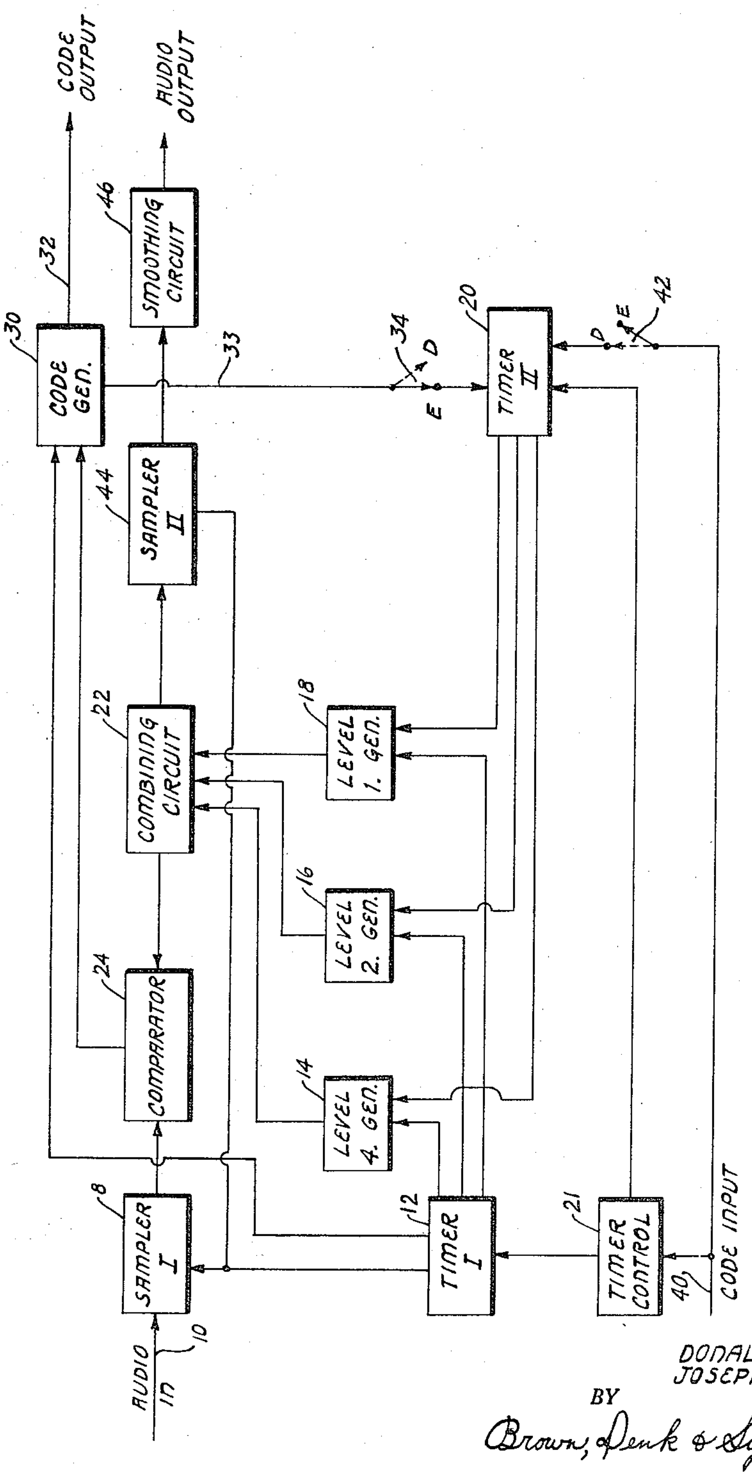
Fig. 1 is a block diagram illustrating the general organization of a system constructed in accordance with the present invention.

The system of Fig. 1 is a system that is capable of representing 8 possible output levels by a three pulse code group. It will also accept three pulse code groups and provide an output signal in the form of an electrical signal in the audio frequency range. The signal to be coded is supplied to sampler 8 by way of an input circuit 10. A signal from timer 12 to sampler 8 causes sampler 8 to generate a stepped version of the signal supplied to input 10. This is done by establishing the amplitude of the signal at the output of sampler 8 at the instantaneous level of the signal at input 10 each time a control signal is supplied from timer 12. In general one signal is supplied from timer 12 to sampler 8 for each code group to be generated and at a time just prior to the time interval within which a code group is to be generated. A preferred form of sampler circuit comprises a normally blocked gate circuit followed by a signal storage circuit. The gate circuit permits a pulse to pass to the signal storage circuit only during the time that the gate circuit is opened by a signal from timer 12. The amplitude of this pulse is equal to the amplitude of the signal at input 10 at the time the gate circuit is opened. The amplitude of this pulse determines the amplitude of the output of the signal storage circuit in a manner well known in the art.

The system of Fig. 1 makes three separate comparisons of the quantized signal at the output of sampler 8 and a variable amplitude reference signal. That is, one comparison is made for each pulse in the code group, the reference signal changing to a different level for each comparison. In Fig. 1 the means for generating a reference level signal comprises three reference level generators 14, 16 and 18, timer 12 mentioned above and a second timer 20. The code generating portion of the circuit includes comparator 24 and code generator 30 which supplies the actual encoded signal at output 32. Timer 20 is a contingent program circuit which is so arranged that output signals may be supplied only at fixed times. However, the presence or absence of a signal at each of these fixed times depends upon conditions existing elsewhere in the circuit at the time a signal is to be generated. Timer circuits 12 and 20 must operate in synchronism. Therefore a timer control circuit 21 is provided for supplying master timing pulses to timers 12 and 20. The two timers control the operation of the reference level generators in a manner which will be explained presently.

The three reference level generators are circuits which can be controlled so as to provide an output signal at either a high or a low amplitude level. In Fig. 1 the generators are caused to switch from one output level to the other by pulse signals received from timers 12 and 20. Preferably, the high amplitude levels are alike for all generators. However, they may be related to one another by an appropriate function such as an exponential power of two. The same is true of the low level for each of the generators. The outputs of the three generators are connected to a combining circuit 22 which provides an output signal which is proportional to the weighted sum of the signals supplied from the three reference level generators 14, 16 and 18. If the output levels of the three generators are alike for each of the two possible levels, the combining circuit 22 applies a weighting factor which is an exponential power of 2. If the amplitude levels of the reference level generators are related by an exponential power of 2 then the combining circuit 22 applies a weighting factor of unity to the three signals. As mentioned above, it lies within the scope of the invention to provide reference level generators in which the amplitudes are neither equal nor related by an exponential power of 2. In such a case, combining circuit 22 would apply the proper weighting factor to cause the contribution of each reference level generator to the output signal of the combining circuit 22 to be related to the signals from the other generators by an exponential power of 2. For example, reference level generator 14 may supply a signal which is either zero or 4, reference level generator 16 may supply a signal which is either zero or 2 and reference level generator 18 may supply a signal which is either zero or 1. If the three reference level generators are all supplying a signal at the higher level, the output signal of combining circuit 22 will be 4+2+1 or a total of 7. If reference level generator 14 is supplying a signal at the higher level but generators 16 and 18 are supplying a signal at the lower level, the output signal of combining circuit 22 will be 4+0+0 or a total of 4. One preferred form of a reference level generator circuit comprises an Eccles-Jordan trigger circuit in which the output signal is taken from one anode of the circuit through a suitable coupling network.

Timer circuit 12 supplies a signal to the three reference level generators at a time just preceding the occurrence of the first pulse in the three pulse group. Timer circuit 12 is further arranged to supply a signal to reference level generator 16 at a time just preceding the generation of the second pulse in the three pulse group, and to supply a signal to reference level generator 18 at a time just preceding the third pulse. In the preferred embodiment of the invention, the signal supplied to all three reference level generators at a time just preceding the occurrence of the first pulse causes reference level generator 14 to provide a signal at the low amplitude level, and reference level generators 16 and 18 to provide a signal at the high amplitude level. That is, generator 14 is set to provide a signal at the level zero and generators 16 and 18 are set to provide a signal at the levels two and one, respectively. Just preceding the time of occurrence of the second pulse, reference level generator 16 is set to provide a signal at the low level, in this example at the level zero. At a time just preceding the occurrence of the third pulse, generator 16 is set to provide a signal at the level zero. Timer circuit 20 is arranged to provide a signal to reference level generator 14 at a time just preceding the occurrence of the second pulse in the three pulse group provided that the first pulse in the group was passed to output 32 of code generator 30. Timer 20 is further arranged to provide a signal to reference level generator 16 at a time just preceding the occurrence of the third pulse in the three pulse group provided the second pulse appeared at the output 32 of code generator 30. In order to provide this contingent operation of timer 20, code generator 30 supplies a second output signal to timer circuit 20 by way of output 33 and switch 34. Switch 34 is closed when the circuit is to be operated as an encoder but is opened when the code is to be operated as a decoder. The letters D and E are abbreviations for "decode" and "encode" respectively. The signal supplied from timer 20 to reference level generators 14 and 16 will reset these two generators from the low level to the high level, that is from zero to four and from zero to two, respectively.

The output of combining circuit 22 is supplied to one input of comparator circuit 24. A second input of comparator circuit 24 is supplied with the output signal of sampler 8. Comparator 24 provides an output signal having a first amplitude if the signal from combining circuit 22 has an amplitude greater than that of the signal supplied by sampler 8. The output signal of comparator 24 has a different value or lies within a different amplitude range if the amplitude of the signal supplied by sampler 8 exceeds that of the signal from combining circuit 22. Comparator 24 may be a conventional voltage amplifier stage in which the signal from combining circuit 22 is supplied to the cathode and the signal from sampler 8 is supplied to the control grid of a triode or pentode amplifier tube.

Code generator 30 is supplied with the output signal of comparator 24 and a second signal from timer 12. In the embodiment of the invention shown in Fig. 1 timer 12 supplies a signal to code generator 30 for each pulse group to be generated. This signal comprises three spaced pulses, the intervals between pulses being very much less than the intervals between pulse groups. Code generator 30 is so arranged that each of the three pulses supplied by timer 12 appears at the output 32 only if the output signal of comparator circuit 24 is at the first amplitude level at the time that pulse is supplied. Therefore, while three pulses are supplied to code generator 30 for each code group, the number of pulses appearing at the output 32 of generator 30 may vary from zero to three depending upon the instantaneous amplitude of the signal to be encoded.

The operation of the system of Fig. 1 as an encoder may now be explained. Suppose the signal supplied at input 10 has a D.-C. component at a level of 3.5 units, and that superimposed upon this D.-C. component is an A.-C. component having a peak amplitude of plus or minus 3 units. Suppose further that, at the time a signal is supplied from timer 12 to sampler 8, the A.-C. component is at a level +1 so that the combined signal is at a level of 4.5. The output of sampler 8 will then be a signal which will remain at level 4.5 for at least the interval during which code generator 30 is providing the three pulse code output. As explained above, at about the time that sampler 8 is energized by a signal from timer 12, generator 14 is set to level zero and generators 16 and 18 to levels two and one, respectively, by a signal from timer 12. Under these conditions, the output signal of combining circuit 22 is at level 0+2+1=3. Since the amplitude of the signal from sampler 8 exceeds the amplitude of the signal from combining circuit 22, the output of comparator 24 will be at the second level. The signal at this second level will cause code generator 30 to pass the first of the three pulses in the three pulse group to outputs 32 and 33. Since a pulse occurs at output 33 of code generator 30, a signal from timer 20 will reset reference level generator 14 to provide a signal at level 4. At approximately the same time the signal from timer 12 will reset level generator 16 from level 2 to level zero. Therefore the output of combining circuit 32 will be 4+0+1=5. Comparator 24 again compares the level of the signal from sampler 8 with the new reference level established by combining circuit 22 and generators 14, 16 and 18. Since the amplitude of the signal from sampler 8 is less than the new reference level, the second pulse will not be passed by code generator 3 to outputs 32 and 33. Following the generation of the second pulse, timer 12 resets generator 18 to level zero. Since no pulse appeared at output 33, timer 20 will not reset generator 16. The third reference level then becomes 4+0+0 or 4. Since the output of sampler 8 exceeds this new reference level, the third pulse will be passed by code generator 30. The binary notation for the output of code generator 30 is 101, which is equivalent to the decimal 5. This code indicates that the output of sampler 8 is greater than 4 but not greater than 5. This is in agreement with the original assumption that the output of sampler 8 is at the level 4.5.

Suppose at some later time the amplitude of the combined signal drops to 0.5. This corresponds to the negative peak of the A.-C. component. The reference level for the first comparison is 0+2+1=3 so the first pulse will not appear at the output 33. Since no signal is received from timer 20 to reset generator 14, the reference level for the second comparison is 0+0+1=1. The second pulse is not passed by code generator 30 because the amplitude of the signal from combining circuit 22 still is greater than the amplitude of the signal from sampler 8. The third comparison is made at the level 0+0+0=0. Therefore the third pulse will be passed by code generator 30. The binary notation for the output code group is 001, which is equivalent to the decimal 1. This indicates that the amplitude of the signal at the output of sampler 8 is greater than zero and less than one.

The system of Fig. 1 also includes a second signal input 40, to which a signal to be decoded may be supplied. The coded signal may be received by way of a radio or a wire link from a distant location. In general there will be no inherent synchronism between the times at which signals are generated by timers 12 and 20 and the times of occurrence of pulse groups supplied to input 40. Therefore input 40 is connected to timer control circuit 21 in order to establish this synchronism. Timer control circuit 21 includes a phasing circuit for shifting the times of occurrence of the master timing pulses supplied thereby to coincide in time with a selected pulse in the received code groups. Input 40 is coupled to a second input of timer 20 through a switch 42. Switch 42 is normally open when the system is set to encode a signal, and normally closed when the system is set to decode a signal. Switches 34 and 42 may be ganged for simultaneous operation if desired. Timer 20 responds to the presence or absence of pulses from input 40 in the same manner that it responds to the presence or absence of pulses from code generator 30 with but one exception. Generators 14 and 16 are reset by the presence of first and second pulses, respectively, in a code group. In addition, timer 20 supplies a signal to generator 18 which resets this generator to provide an output signal at the high amplitude level in response to the presence of the third pulse in a code group. It will be remembered that timer 20 reset generators 14 and 16 in response to signals received from output 33 of code generator 30 but that generator 18 was not reset.

A second sampler 44 receives an input signal from combining circuit 22 and a control signal from timer 12. Sampler 44 performs functions which are identical to those performed by sampler 26 so that the circuits employed in these two units are equivalent if not identical. The control signal from timer 12 is supplied to sampler 44 at a time following the last pulse in each code group. Therefore the output signal of sampler 44 has an amplitude equal to the final level reached by combining circuit 22 in response to a particular received code group. The signal storage portion of sampler 44 will cause the output signal of sampler 44 to remain substantially constant in the interval between successive pulse groups supplied by way of input 40. This causes the signal in the output of sampler 44 to be a step waveform that resembles the original signal represented by the coded input signal. Smoothing circuit 46 is a low pass filter circuit which removes some of the high frequency components and eliminates the strong component at the sampling frequency which is present in the output of sampler 44.

With this additional description the operation of the system of Fig. 1 as a decoder may be explained. Suppose, for example, that a code group is received in which the first and third pulses are present and the second pulse is absent. The binary notation for this code group is 101. This code group is equivalent to decimal level 5. In responding to this code group, generator 14 is first reset to zero level by timer 12 and generators 16 and 18 are set to levels two and one respectively. The reference level is thus set to 0+2+1=3. The occurrence of the first pulse in the signal to be decoded causes timer 20 to reset generator 14 to level 4. At approximately the same time a signal from timer 12 resets generator 16 to the level zero. The reference level is now 4+0+1=5. Since no second pulse is present in the code group, generator 16 will not be reset by timer 20. However, timer 12 resets generator 18 to the level zero at approximately the time that the second pulse would occur. The reference level is then at 4+0+0=4. The occurrence of the third pulse causes timer 20 to reset generator 18 to the level one. The final level reached by the reference level signal at the output of combining circuit 22 is 4+0+1=5. Sampler 44 is activated by a signal from timer 12 at a time just following the final resetting of generator 18. The output of sampler 44 is a signal at level 5 which is the decimal equivalent of the binary number 101.

Means may be provided for disabling code generator 30 during the decoding operation to prevent a coded signal from being supplied to output 32. However, this is not necessary in the embodiment shown in Fig. 1 if the input to sampler 8 is kept at zero level during the decoding operation. It will be remembered that a zero level input to sampler 8 results in the absence of all three pulses at output 32.

The embodiment of the invention shown in Fig. 2 generates or responds to a four pulse binary code group which can represent 16 amplitude levels. The timing pulses in the system of Fig. 2 are generated by combining six timing signals in appropriate coincidence circuits. These six signals are shown in Fig. 4. The first has a rectangular waveform 50. The second has a rectangular waveform 52 which is the inverse of waveform 50. The third signal has a rectangular waveform 54 at twice the frequency of waveform 50. The fourth signal has a waveform 56 which is the inverse of waveform 54. A series of negative pulses 58 at a repetition frequency which is twice the frequency of waveform 54 makes up the fifth signal. A second series of negative pulses 60 having a repetition frequency equal to that of pulses 58 but a phase which differs from that of pulses 58 by half a repetition period comprises the sixth signal.

The breaking down of timers 12 and 20 of Fig. 1 into the coincidence circuits controlled by the six timing signals, the addition of the units necessary to generate or respond to an extra pulse and the inclusion of certain buffer and isolation stages all cause the system of Fig. 2 to appear to be much more complex than the system of Fig. 1. Therefore it will be helpful to keep in mind that the basic operation of the system of Fig. 2 is substantially identical to that of the system of Fig. 1. As a further aid to understanding the system of Fig. 2, in so far as is possible the elements there shown are described in groups corresponding to blocks shown in Fig. 1.

Turning now to Fig. 2, the signal to be coded is supplied by a speech amplifier 70 to a low-pass filter 72 which limits the maximum frequency present in the signal to be coded to a value approximately one-half that of the sampling frequency. A level adjusting circuit 74 is provided for superimposing an appropriate bias potential on the signal at the output of filter 72. A cathode follower 76 is included as a buffer between the circuits which precede it and sampler 78. Comparator 80 corresponds to comparator 24 of Fig. 1. This circuit is connected to the outputs of sampler 78 and combining network 82 through cathode followers 84 and 86, respectively. These cathode followers serve as low impedance sources for driving comparator 80.

Four Eccles-Jordan trigger circuits 90, 92, 94 and 96 from the reference level generators of the system of Fig. 2. These reference level generators are connected to combining network 82 through single stage buffer amplifiers 100, 102, 104 and 106, respectively. The legend 8 WT EJ in block 90 indicates that this generator provides the eight weight signal. That is, the output signal of circuit 90 can have either one of two amplitudes. One amplitude will result in an output signal from combining network 82 which is eight units higher than the signal which will result from a signal of the other amplitude. Block 90 has been divided by a broken line to indicate the two halves of an Eccles-Jordan circuit. It should be noted that, in Fig. 2, the output signals are taken from the left halves of each of the circuits 90, 92, 94 and 96.

The functions performed by timer 12 of Fig. 1 are performed by reset trigger gate 108, reset pulse generator 110, buffer 112, delay means 114 and 116, sampler pulse generator 118 and trigger gate generators 122, 124 and 126. Reset trigger gate 108 is a coincidence circuit which receives at three inputs signals having the waveforms 50, 54 and 58 of Fig. 4. The output signal from trigger gate 108 is a pulse which recurs at the frequency of waveform 50 and at a time $t_1$ just following the leading edge of the positive half cycle of this waveform. Reset pulse generator 110 is a buffer amplifier stage which produces one output pulse for each pulse supplied to it by trigger gate circuit 108. This reset pulse generator 110 provides the signal which initially sets the generators 90, 92, 94 and 96 to the proper condition to encode or decode a signal. Reset buffers 130, 132, 134 and 136 are merely isolation stages between the output of reset pulse generators 110 and the reference generators 90, 92, 94 and 96.

A switch 140 is provided for disconnecting the input of reset generator 110 from reset trigger gate 108 and for connecting it to the output of delay means 116. Switch 140 is placed in the position shown by the solid line when the circuit is set to encode a signal and is set to the position shown by the broken line when the circuit is set to decode a signal. This change is made in order to accomplish a slight change in the time at which the reference level generators are reset. The reason for this shift in timing will appear presently. It should be noted that reset buffers 132, 134 and 136 are connected to the left halves of generators 92, 94 and 96, respectively, but that reset buffer 130 is connected to the right half of generator 90. It will be remembered that, in the circuit of Fig. 1, the highest weight reference level generator was initially set to a low level while the remaining generators were initially set to a high level. With the connection shown in Fig. 2, initially one-half of generator 90, the highest weight generator of Fig. 2, will be conducting when the opposite halves of generators 92, 94 and 96 are conducting.

The signal from buffer 112 is supplied to sampler pulse generator 118 to control the operation of this circuit. Sampler pulse generator 118 supplies a sampling pulse signal to speech sampler 78. Basically sampler pulse generator 118 is an amplifier stage. However, the time constants of the coupling circuits are so chosen that there is a short delay between the time a signal is supplied to the input and the time the sampling pulse signal is generated. This interval is less than the interval between times $t_1$ and $t_2$ of Fig. 4.

Trigger gate circuits 122, 124 and 126 are coincidence circuits. The function of these circuits is to reset each of the reference generators 92, 94 and 96 at the proper time during the encoding and decoding operation. It will be remembered, from the description of the operation of the system of Fig. 1, that these generators are reset in sequence regardless of what takes place in the remainder of the circuit. Trigger gate 122 is supplied with three signals having the waveforms 50, 56 and 58 of Fig. 3 and generates an output pulse at time $t_3$. Trigger gate 124 is supplied with signals having waveforms 52, 54 and 58 and generates an output pulse at time $t_5$. Similarly, trigger gate 126 is supplied with signals having waveforms 52, 56 and 58 and generates an output pulse at time $t_7$.

The functions performed by timer 20 of Fig. 1 are performed by reset gates 150, 152, 154 and 156. Reset gates 150, 152, 154 and 156 are coincidence circuits which are similar in construction to trigger gate 122. These reset gates are supplied with signals as follows: reset gate 150 with waveforms 50 and 56; reset gate 152 with waveforms 52 and 54; reset gate 154 with waveforms 52 and 56; and reset gate 156 with waveforms 50 and 54. However, these signals alone are not sufficient to cause an output signal to be generated by these circuits. The output of code inverter 160 is connected to each of these reset gates. Code inverter 160 is an amplifier stage which receives a signal from the code generating portion of the system which will be described presently. If all possible pulses were present at the output of code inverter 160, the signal would have the waveform 58 of Fig. 3. Under these conditions the reset gates 150, 152, 154 and 156 would generate output pulses at times $t_3$, $t_5$, $t_7$ and $t_1$, respectively. However, one or more of the pulses may be absent at the output of code inverter 160. In this event the reset gate, which would have produced an output signal if the pulse were present, will produce no such output pulse. The outputs of reset gates 150, 152, 154 and 156 are connected to the left hand halves of reference generators 90, 92, 94 and 96, respectively. The connection of reset gate 156 to reference generator 106 is through switch 158 which is normally open when the system is set to encode a signal and is closed when the circuit is arranged to decode a signal.

Code inverter 160, together with limiter 162, buffers 164 and 166, code trigger gates 168 and 170, code gate generator 172, inverters 174 and 176 and local code gate 188, form the code generating portion of the system of Fig. 2. The output of comparator 80 is connected to the input of limiter 162. The output signal of comparator 80 is at one level if the amplitude of the output signal of sampler 78 is less than that of the output signal of combining network 82 but at any one of several other possible levels if the relative amplitudes are reversed. Limiter 162 and buffers 164 and 166 convert this output to an on-off signal for controlling code trigger gates 168 and 170. Code trigger gates 168 and 170 are so arranged that one will be capable of passing a signal if the amplitude of the output from sampler 78 is greater than that of the output signal of combining circuit 82, and the other will be capable of passing a signal if the amplitude of the reference signal at the output of combining circuit 82 exceeds the amplitude of the sampled signal at the output of sampler 78. This is accomplished by connecting the output of buffer 164 to code trigger gate 168, and the output of buffer 166, which is a single stage amplifier, to code trigger gate 170. Code trigger gates 168 and 170 are supplied by inverter circuit 174 with signals having the waveform 60 of Fig. 4. Code gate generator 172 is an Eccles-Jordan type trigger circuit. The output of trigger gate 168 is connected to the left half of the circuit and code trigger gate 170 is connected to the right half of the circuit. This arrangement causes the output of the left half of code gate generator 172 to be at a high potential whenever the amplitude of the output signal of sampler 78 exceeds the reference potential. That is, the signal from code trigger gate 170 will cause the signal from the left half of code gate generator 172 to become high if it was previously low but will have no effect if it was already high as a result of being so set by a previous pulse in the code group. Similarly, the signal from code trigger gate 168 sets the output of code gate generator 172 low if it was previously high, but it does nothing if the output was already low. Local code gate 188 is a coincidence circuit which is arranged to pass a signal received from inverter 176 provided the output of code gate generator 172 is high. In the circuit of Fig. 2 the two signals are supplied to a single input of local code gate 188, but a two input coincidence circuit can be substituted therefor. The signal supplied by inverter 176 is a series of pulses corresponding to waveform 58 of Fig. 3. Therefore the signal at output 190 is a coded signal which represents the amplitude of the signal from amplifier 70 at the time that this signal was last sampled by sampler 78.

As mentioned above, the output of local code gate 188 is supplied through code inverter 160 to reset gates 150, 152, 154 and 156. By reason of this, the reset gates generate the contingent control signals of the type supplied by timer 20 of Fig. 1. A switch 192 is provided between local code gate 188 and code inverter 160. This switch is normally closed when the circuit is set to encode a signal and is open when the circuit is set to decode a received signal. Thus switch 192 performs the same function as switch 34 of Fig. 1.

The portion of the system of Fig. 2 described above, except for delay means 114 and 116, comprises the complete encoding portion of the system. As explained above, delay means 114 and 116 are employed to introduce a short delay in the reset time when the system is set to decode a signal. Also included in the decoding circuit is a code input inverter 200 which couples input 202 to reset gates 150, 152, 154 and 156 through switch 204. Switch 204 corresponds to switch 42 of Fig. 1. Sampler pulse generator 118 is connected to the control input of decoding sampler 206. The output signal of combining network 82 is supplied to the signal input of sampler 206 through cathode follower 86 and buffer amplifier 208. The output signal of sampler 206 is a stepped waveform signal similar to the signal appearing at the output of sampler 78. The output of sampler 206 is coupled through cathode follower 210 to a low-pass smoothing filter 212 which removes the abrupt steps from the waveform. The decoded output signal for the entire system appears at output 214 of filter 212.

The system of Fig. 2 operates in much the same manner as the system of Fig. 1. Briefly, the operation of the system of Fig. 2 in an encoding system is as follows. The three signals supplied to the input of reset trigger gate 108 causes this circuit to produce a negative pulse at time $t_1$ of Fig. 4. This negative pulse is inverted by reset pulse generator 110 and supplied to reset buffers 130, 132, 134 and 136. Each of these reset buffers produces a negative output pulse substantially at time $t_1$. These negative pulses cause the halves of the reference generators 90, 92, 94 and 96 associated with reset buffers 130, 132, 134 and 136 to be at a low potential. With the arrangement shown in Fig. 2 the signal supplied by reference generators 92, 94 and 96 to buffers 102, 104 and 106, respectively, will be low. As mentioned above buffers 102, 104 and 106 are single stage amplifiers, so that the output of these buffers will be at a high level in response to the low level input signal. Since the signal from reset pulse generator 110 is supplied to the right half of the reference generator 90, the left half of this generator from which the output signal is taken will be at a high level. The high level signal supplied to buffer 100 will cause the output of the latter circuit to be at a low level. Therefore the total input to combining network 82 is equal to the sum of the signals from buffers 102, 104 and 106. As in Fig. 1 it is convenient to refer to these levels as 4, 2 and 1, respectively, so that the output of combining network 82 is initially at level $0+4+2+1=7$.

The signal from reset pulse generator 110 is also supplied to sampler pulse generator 118. Sampler pulse generator 118 provides a positive pulse to sampler 78 at a time slightly later than $t_1$ of Fig. 4. This delay is produced by suitable RC coupling networks and clipping networks in generator 118. The A.-C. signal from amplifier 70 is supplied to the input of sampler 78 through a filter 72 and cathode follower 76. A level adjusting circuit 78 superimposes a bias at level +7 on the A.-C. signal from amplifier 70. This bias permits the representation of both the positive and negative half cycles of the signal from amplifier 70. The output signal of sampler 78 is the quantized or boxcar type signal described in connection with the description of the system of Fig. 1. As explained above, the signal from sampler 78 is supplied to the cathode of an amplifier stage in comparator 80 and the signal from combining network 82 is supplied to the control grid of this amplifier stage. If the potential at the cathode is greater than that of the control grid, this amplifier stage will be cut off and the output signal supplied from comparator 80 to limiter 162 will be at a high level. However, if the signal from combining network 82 is at a higher amplitude than the signal supplied by sampler 78, the control grid of the amplifier stage in comparator 80 will be above cutoff and the tube will conduct. The degree to which the tube will conduct will depend on the relative magnitudes of the signals on the control grid and cathode, respectively. In any event the potential at the anode of the tube, when conducting, will be lower than the potential at this point when the relative amplitudes of the signals on cathode and grid are reversed. As mentioned earlier, the function of limiter 162 and buffers 164 and 166 is to convert the multilevel signal from comparator 80 to an on-off signal which has one value if the relative amplitudes of the two signals supplied to comparator 80 have one polarity, and a different value if the relative amplitudes are of the opposite polarity.

Now let us assume that the output of sampler 78 is at some level, such as level 11.5, which would correspond to an output level of 4.5 from amplifier 70 and a bias of +7 from level adjusting circuit 74. The output of comparator 80, at a time immediately following the sampling pulse, will be at a high level. This high level signal to limiter 162 will result in a high level signal being supplied to buffer 164. The high level signal to buffer 164 will result in a low level signal being supplied to buffer 166 and code trigger gate 168.

The low level signal to buffer 166 will cause a high level signal to be supplied to code trigger gate 170. As explained above, inverter 174 supplies code trigger gates 168 and 170 with pulses corresponding to waveform 60 of Fig. 4. The low level signal supplied to code trigger 168 will prevent this circuit from passing the signal received from inverter 174. However, the high level signal being supplied to code trigger gate 170 from buffer 166 will permit this circuit to pass a signal to code gate generator 172 at time $t_2$. Code gate generator 172 responds to this negative signal from code trigger gate 170 and supplies a positive gate signal to local code gate circuit 188. Inverter 176 supplies pulses to local code gate circuit 188 at times shown in waveform 58 of Fig. 4. The next pulse following time $t_2$ occurs at time $t_3$, and therefore a code pulse will appear at code output 190 at this time.

The code signal appearing at code output 190 is also supplied to code inverter 160 in the form of a negative pulse. Code inverter 160 supplies a positive pulse to reset gates 150, 152, 154 and 156 at time $t_3$. Only reset gate 150 can pass a signal at this time, the other circuits being biased off by the two control signals supplied thereto. The output signal from reset gate 150 causes reference generator 90 to reverse its initial state. The output signal from reference generator 90 is now low and the output of buffer 100 is high. This causes the signal at the output of combining network 82 to increase in level by eight units. However, at the time that reference generator 90 is being reset to the low level, the three signals supplied to trigger gate 122 produce an output pulse to reference generator 92. Reference generator 92 is reset by this pulse to supply a high output signal to buffer 102. Buffer 102 now supplies a low level signal to combining network 82, which reduces the output signal of combining network 82 by four units. The level of the output signal of combining network 82 is now $8+0+2+1=11$. Since the signal from sampler 78 still exceeds the reference level of combining network 82, the second pulse in the group will be passed by local code gate 188. This second pulse will reset reference generator 92 to its original condition, causing buffer 102 again to supply a signal at the high level to combining network 82. This resetting will occur at time $t_5$. At approximately the same time the signal from trigger gate 124 will reset reference generator 94 so that buffer 104 supplies a signal at the low level to combining network 82. The output signal of combining network 82 is now at a level $8+4+0+1=13$. Since the level of the signal at the output of combining network 82 is now greater than the level of the signal from sampler 78, comparator 80 will supply a signal at a low level to limiter 162 and the third output pulse will not be passed by local code gate 188. Local code gate 188 is caused to block this third pulse by a signal passed by code trigger gate 168 in response to the high level signal from buffer 164. The negative signal from local code trigger gate 168 causes gate 172 to provide a signal at a low level which blocks local code gate 188. Since the third pulse does not appear at the output of local code gate 188, reset gate 154 does not generate a reset signal and reference generator 94 remains at its high level. However, at the time $t_7$, when the third output pulse would normally occur, trigger gate 126 resets reference generator 96 to the high level, thus causing the output of buffer 106 to be at the low level. The level of the signal at the combining network 82 is now $8+4+0+0$ or 12. This value is still larger than the signal at the output of sampler 78 so the fourth pulse will not appear at output 190.

The above example illustrates that the code signal appearing at output 190, in response to a signal supplied to sampler 78 at level 11.5, can be represented by the binary notation 1100 which corresponds to the decimal 12.

The operation of the system of Fig. 2 as a decoder circuit will now be explained. Switches 140, 158, 192 and 204, which were originally in the positions E, are moved to the positions D. This connects the output of reset gate 156 to reference generator 96. It also connects the output of code input inverter 200 to reset gates 150, 152, 154 and 156. Switch 192 disconnects the output of local code gate 188 from the input of code inverter 160. Switch 140 disconnects the input of reset pulse generator 110 from the output of reset trigger gate 108 and connects it to the output of delay means 116.

Suppose now that the signal to be decoded consists of a pulse code group represented by the binary notation 1011. This corresponds to a code group in which the first, third and fourth pulses are present and the second pulse is absent. The output of buffer 112 is a pulse at time $t_1$. Delay means 114 and 116 delay this pulse until the time approximately $t_2$. This pulse from delay means 116 is supplied to reset pulse generator 110 which, in turn, supplies a reset pulse to reset buffers 130, 132, 134 and 136. As explained above, in connection with the encoding operation of the system of Fig. 2 reference generator 90 is set to provide an output signal at a high level, and reference generators 92, 94 and 96 provide output signals at a low level. The outputs of buffer 100 will be at a low level and the outputs of buffers 102, 104 and 106 will be at a high level. Therefore the output of combining network 82 will be at level $0+4+2+1=7$. The signal to be decoded is supplied to input 202. This signal is phased by means not shown in Fig. 2 so that the first pulse in the code group occurs at time $t_3$. In the example chosen above, the first pulse is present in the code group. This first pulse causes reset gate 150 to reset reference generator 90 to provide an output signal at the low level. This causes the output of buffer 100 to be at a high level. At time $t_3$ the signal from trigger gate 122 sets reference generator 92 to provide a signal at a high level thus causing the output of buffer 102 to be at a low level. The output of combining network 82 is now at level $8+0+2+1=11$. In the example chosen above, the second pulse was absent from the code group. Therefore reset gate 152 does not generate a reset signal at time $t_5$ and the reference generator 92 remains at the high level. At time $t_5$ trigger gate 124 generates a signal which resets generator 94 to provide an output signal at a high level. Again this causes the output of buffer 104 to be at a low level. The new level at combining network 82 thus becomes $8+0+0+1=9$. At time $t_7$ the third pulse is supplied from code input inverter 200 to the four reset gates. However, only reset gate 154 is conditioned to pass an output signal to the reference generators. Reset gate 154 passes a reset signal to reference generator 94 and causes the output signal of this reference generator to change to the low level. At time $t_7$ trigger gate 126 causes reference generator 96 to have an output signal at the high level. The signal at the output of combining network 82 will be at level $8+0+2+0=10$. At time $t_1$ the fourth pulse in the code group causes reset gate 156 to reset reference generator 96 to provide an output signal at the low level. This restores the output buffer 106 to the high level and the final output level of combining network 82 is $8+0+2+1=11$.

Sampler pulse generator 118 supplies a pulse signal to decoding sampler 206 at a time approximately half way between times $t_1$ and $t_2$. The signal thus supplied causes sampler 206 to generate an output signal equal in amplitude to the signal supplied thereto by buffer 208. Since buffer 208 is supplied from the output of combining network 82 through cathode follower 86, the output signal generated by sampler 206 will be at level 11. Sampler 206 is so constructed that the signal will remain at level 11 until the next code group has been decoded and a new signal supplied to sampler 206 from delay means 114. If the signals supplied to input 202 are successive pulse codes represented by the binary notations 1011, 1010 and 1001, representing respectively decimal levels 11, 10, 9 etc., the output of sampler 206 will decrease in steps correspondingly. Such a decrease might represent the descending portion of a sine wave signal at the point of origin of the coded input signals. As mentioned earlier, filter 212 blocks components at the sampling frequency and smooths out the steps in the output signal of sampler 206. The filtered signal is supplied to output 214.

A system for generating a five pulse code representing 32 output levels would be very similar to the system shown in Fig. 2. Reference generator 90 would be changed to provide a signal at level 16, and an additional group of circuits corresponding to buffer 102, reference generator 92, trigger gate 122, reset buffer 132 and reset gate 152 would be added to the system. This group of circuits would provide an output signal at level 8. It would be necessary to change the timing waves to cause the five groups of circuits to operate in the proper sequence. Such a change is well within the capabilities of one skilled in the art.

The timing circuits described above have been found to be relatively simple as well as very stable and reliable. However, the invention is not to be restricted to timing circuits of this type since other sequence timing circuits, for example cascaded trigger circuits or multivibrators or tapped delay lines, are well known in the art. Similarly, other forms of reference generators and sampling circuits may be substituted without departing from the true scope of the invention.

In the embodiments of the invention described above, the duration of the interval during which a code group is generated is equal to the time between successive sampling pulses. This arrangement makes full use of the time that is available. However, it lies within the scope of the invention to generate a code group in an interval short compared to the time between sampling pulses. Several such signals could be time multiplexed on a single transmission channel.

Figs. 3A, 3B and 3C together form a schematic diagram of a preferred embodiment of the invention which is similar to the one shown in Fig. 2. If Fig. 3A is placed above Fig. 3B and Fig. 3C is placed to the right of Figs. 3A and 3B, the arrangement of this composite schematic will correspond almost exactly to the arrangement of the blocks in Fig. 2. As a further aid in understanding the circuit of Figs. 3A, 3B and 3C, individual circuits in Figs. 3A, 3B and 3C are given primed reference numerals corresponding to related blocks in Fig. 2. For example, buffer 100 of Fig. 2 corresponds to circuit 100′ of Fig. 3A. Since many of the individual circuits are in themselves conventional, and since these individual circuits repeat themselves several times in the over-all system, only portions of the circuit of Figs. 3A, 3B and 3C will be described in detail.

Turning now to the portion of the circuit shown in Fig. 3A, amplifier stage 70′ and cathode follower 70″ correspond to speech amplifier 70 of Fig. 2. These circuits are conventional resistance-capitance coupled stages and need no further explanation. Filter 72′ is again shown in block form since low-pass filter circuits are well known in the art. Level adjusting circuit 74′ comprises a tapped potentiometer connected between ground and a source of negative potential represented by the minus sign. The output of filter 72′ is supplied to the input of cathode follower 76′ through a conventional resistance-capacitance coupling network which is returned to the tap on level adjusting circuit 74′. Sampler 78′ comprises two triode connected pentodes arranged in parallel with one pentode reversed with respect to the other. The signal from speech sampler generator 118′ of Fig. 3C is supplied to the respective control grids of these two pentodes. These two pentodes are normally cut off by virtue of the negative bias supplied to their control grids, and are turned on by the positive pulses received from speech sampler generator 118′ of Fig. 3C. Capacitor 78″ forms a part of the sampler circuit. This capacitor is charged or discharged through the two sampler tubes to the potential of the cathode of stage 76′ at the time the sampling pulse is supplied to the grids of the parallel combination 78′. The reverse connection of the pentodes allows capacitor 78″ either to charge or to discharge depending on whether the potential at the cathode of stage 76′ has increased or decreased since the last sampling time.

Stage 84′ is again a conventional cathode follower circuit. Since the input impedance of the cathode follower stage is high, there is very little change in the potential across capacitor 78″ in the interval between the successive amplitude pulses.

The cathode of stage 84′ is connected to the cathode of a tube in comparator stage 80′. The comparator stage is a pentode amplifier stage having the usual anode load impedance. The control grid of the tube in stage 80′ is supplied with a signal from cathode follower 86′. As explained above in connection with the description of the operation of the circuit of Fig. 2, stage 80′ will conduct only if the potential at the control grid is sufficiently high with respect to the potential on the cathode to be above the cut-off potential of the tube in stage 80′. The potential on the cathode is determined by the output of sampler 78′ and the potential on the control grid is at a level determined by the reference level combining network.

In the circuit of Fig. 3A all of the reference generators are identical and produce output signals at the same level. Combining network 82′ comprises a relatively small resistance 82″ in series with the parallel combination of resistors 82*a*, 82*b*, 82*c* and 82*d*. The resistances of resistors 82*a*, 82*b*, 82*c* and 82*d* are related in the ratio 1; 2; 4; 8. The smallest of these resistors has a resistance slightly greater than that of resistor 82″. Because of the voltage divider action of these resistors, the contribution of reference level generator 90′ to the input of cathode follower stage 86′ will be approximately 8 times that of reference generator 96′.

The circuit enclosed within the broken line 90′ is the reference level circuit corresponding to block 90 of Fig. 2. It will be seen that this circuit is a conventional Eccles-Jordan trigger circuit. The enclosing line has been omitted from reference generators 92′, 94′ and 96′ in order to simplify the drawing.

Buffer 100′ is a conventional pentode amplifier stage except that it includes a diode 100″ in shunt with the anode impedance. The diode 100″ is returned to a fixed potential which is much lower than the anode supply potential. If the signal supplied from reference generator 90′ to buffer 100′ is at a low level, buffer 100′ will be cut off and the potential at the anode will be at the potential to which the diode is returned. If the signal supplied by reference generator 90′ is at a high level, tube 100′ will be conducting and the potential at the anode will be near ground. Similarly diodes are provided in buffers 102′. 104′ and 106′. Diodes 100′, 102′, 104′ and 106′ are provided to shorten the rise time of the output signal. The leading edge of the square waves produced by the reference generators is exponential in form. The lower portion of this leading edge, that is the portion between ground potential and the potential to which the diode is returned, has the sharpest rise of any portion of the signal. It is this lower portion that forms the leading edge of the output signal. If the system is arranged to operate at a relatively slow rate, so that the rise time of the reference signal is not important, the diodes may be omitted.

Trigger gate 122′ is a conventional pentode amplifier stage which shares the anode load impedance of the night half of reference generator 92′. Three resistors 122*a*, 122*b* and 122*c* are connected in parallel to the resistance-capacitance input circuit of stage 122′. This input circuit is returned to a negative potential which normally holds stage 122′ cut off. A signal having waveform 58 of Fig. 4 is supplied to resistor **122*a*, a signal having waveform 50 is supplied to resistor 122*b*, and a signal having waveform 56 is supplied to resistor 122*c*. It will be recognized that the complete circuit, including the amplifier stage 122′ and resistors 122*a*, 122*b* and 122*c*, comprises a conventional coincidence circuit in which the input signals are combined by the resistance network before being supplied to the control grid of the amplifier stage 122′. Trigger gates 124′ and 126′ are similar in construction to circuit 122′**.

Turning now to the portion of the circuit shown in Fig. 3B, reset buffer 130′ is a pentode amplifier stage which shares the load impedance of the right half of reference generator 90′ in Fig. 3A. The control grid in buffer 130′ is supplied with a signal from the reset pulse generator 110′ appearing in the portion of the circuit shown in Fig. 3C. Reset buffers 132′, 134′ and 136′ are identical to reset buffer 130′ except that they share the anode load impedance of the left halves of reference generators 92′, 94′ and 96′, respectively. Reset gates 150′, 152′, 154′ and 156′ are identical in their arrangement to trigger gate 122′. Two of the signals supplied to the control grid of each of these gates are derived from the fixed timing waveform shown in Fig. 4. A third signal, which is common to all of the reset gates, is derived from a circuit corresponding to either the code inverter circuit 160 of Fig. 2 or the code input inverter circuit 200.

The anode of comparator stage 80′ of Fig. 3A is connected to the control grid of limiter stage 162′ of Fig. 3B. The control grid of stage 162′ is returned to a negative potential which holds stage 162′ cut off unless a potential above a predetermined level is supplied from comparator 80′. The output of stage 162′ is directly coupled to a second amplifier stage 162″. The output of stage 162″ is directly coupled to the input of buffer 164′. If the signal supplied to the grid of limiter 162′ from comparator 80′ is below the level necessary to cause conduction in limiter 162′, the anode of 162′ will be at a high potential. This will cause the control grid of limiter stage 162″ to be at a high potential and the anode of this stage to be at a low potential. The low potential at the anode of 162′ causes buffer stage 164 to be cut off. The anode of stage 164′ will then be at a high potential. The anode of stage 164′ is directly connected to the input of buffer stage 166′. If the anode of stage 164′ is at a high potential, the grid of buffer 166′ will be at a high potential and the anode of this stage will be at a low potential. If the signal to the grid of limiter stage 162′ is at any value above the level necessary to cause this stage to conduct, the anode of stage 162′ will be at a low potential, the anode of stage 162″ at a high potential, the anode of buffer 164′ at a low potential, and the anode of buffer 166′ at a high potential.

The anode of buffer 164′ is connected through an appropriate resistance network to the control grid of code trigger gate 168′. This resistance network is returned to a negative potential so that gate 168′ is normally held well below cut-off in the absence of a high potential at the anode of buffer 164′. A high potential at the anode of 164′ raises the grid of gate 168′ to a value slightly below cut-off. Positive pulse signals are also supplied to the control grid of stage 168′ from inverter 174′.

The output of buffer stage 166′ is connected to the control grid of code trigger gate 170′ through a resistance network. The pulses from inverter 174′ are also supplied the control grid of code trigger gate 170′. The operation of gate 170′ is identical to that of gate 168′ except that the circuit is so arranged that gate 170′ is in a condition to pass pulse signals from inverter 174′ when gate 168′ is held well below cut-off, and vice versa. The pulse signals from inverter 174′ correspond to waveform 60 of Fig. 4.

Code trigger gate 168′ shares the load impedance of the left half of code gate generator 172′. Code trigger gate 170′ shares the load impedance of the right half of code gate generator 172′. Code gate generator 172′ is a conventional Eccles-Jordan trigger circuit. If, for example, code trigger gate 170′ is caused to conduct by signals supplied to its control grid, the anode potential of the right half of code gate generator 172′ will tend to drop. If the right half of circuit 172′ was cut off, so that the anode was at a high potential, this drop in potential will be communicated to the control grid of the left half of circuit 172′. The drop in potential will cut off the left half of circuit 172′ which raises the potential on the grid of the right half of the circuit. This tends still further to decrease the potential on the anode of the right half. This is the usual trigger action of the Eccles-Jordan circuit. It will be obvious to those familiar with circuits of this type that if the anode of the right half of circuit 172′ was at a low potential, raising the grid of circuit 170′ above cut-off will have very little effect on circuit 172′ since it will only tend to lower the potential of the anode of the right half of the circuit and the control grid of the left half of the circuit, which are already at a low potential. The anode of the left half of code gate generator 172′ is connected through a resistance coupling network to the input of local code gate circuit 188′. Again this resistance coupling network is returned to a negative potential so that circuit 188′ is normally held well below cut off in the absence of a high potential supplied from circuit 172′. A high potential supplied by circuit 172′ raises the control grid of circuit 188′ to a point just below cut off. Positive pulse signals corresponding to waveform 58 of Fig. 4, supplied by inverter 176′, will raise the grid of stage 188′ above cut off and cause negative pulse signals to appear at output 190′. A reference to the description of the operation of the circuit of Fig. 2 will show that the signal appearing at the output 190′ is the desired coded output signal.

The anode of local code gate 188′ is connected to the input of code inverter 160′ through a resistance-capacitance coupling circuit which is normally returned to a positive potential. Therefore stage 160′ is normally conducting except when it is cut off by negative pulses supplied by local code gate 188′. These negative pulses produce positive pulses at the anode of code inverter 160′, which are supplied to the reset gate circuits 150′, 152′, 154′ and 156′. The function of switch 192 of Fig. 2 is provided for in the circuit of Fig. 3 by a switch **160*a* which returns the screen grid of circuit 160′ selectively to a positive or a negative potential. Switch 160*a* connects the screen grid to a positive potential when the circuit is set to encode a signal. Under these conditions circuit 160′ will pass pulse signals supplied by circuit 188′. With the screen grid returned to the negative potential, stage 160′ is held in a cut-off condition so that it cannot pass signals from circuit 188′**.

Signals to be decoded are supplied to input 202′. Input 202′ is connected to the control grid of code input inverter 200′ through a resistance-capacitance network which is returned to a positive potential. Stage 200′ shares the same anode load impedance as circuit 160′. The function of switch 204 of Fig. 2 is provided for in Fig. 3 by switch **200*a* which returns the screen grid of stage 200′ selectively to a positive or a negative potential. Switch 200*a* connects the screen grid of circuit 200′ to a negative potential when switch 160*a* connects the screen grid of circuit 160′ to a positive potential. The signal supplied to reset gates 150′, 152′, 154′ and 156′, when the circuit is set to decode a signal, will be substantially identical to the signal supplied during the encoding operation since the circuit from input 202′ to tube 200′ is substantially identical to that from circuit 188′ to tube 160′**.

Turning now to the portion of the circuit shown in Fig. 3C, reset trigger gate circuit 108′ comprises a coincidence amplifier stage which is supplied with three fixed timing signals by way of resistors **108*a*, 108*b* and 108*c*. The signal supplied to resistor 108*a* has the waveform 58 of Fig. 4 and the signals supplied to resistors 108*b* and 108*c*, respectively, have the waveforms 50 and 54** of Fig. 4. The operation of reset trigger gate 108' is substantially identical to the operation of trigger gate 102' of Fig. 3A. The anode of circuit 108' is connected through a resistance-capacitance coupling network to the control grid of tube **110*a* in reset pulse generator 110'. It is also connected to the control grid of buffer 112'. The resistance-capacitance networks connected to the control grids of the tubes in circuits 110' and 112' are returned to a positive potential so that these tubes are normally conducting unless cut off by negative pulses supplied by circuit 108'. The screen grid of tube 110*a* is connectable by a switch 110*b*** to either a positive or a negative potential. The screen grid is connected to a positive potential when the circuit is set to encode a signal and is connected to a negative potential when the signal is set to decode a signal.

The reset pulse, appearing at the anode of tube **110*a* in the circuit 110', is supplied to the control grid of the reset buffers 130', 132', 134' and 136' in the portion of the circuit shown in Fig. 3B. The positive pulses appearing at the anode of the tube in buffer circuit 112' are supplied to the control grid of sampler pulse generator 118' through a resistance-capacitance network 118*a*—118*b*. Resistor 118*a* has a relatively large value, for example one megohm, and is returned to a positive potential. Capacitor 118*b* also has a relatively large value. In this arrangement capacitor 118*b* charges through the relatively low grid-cathode impedance of circuit 118' during the time that the positive pulse is generated by circuit 112'. At the termination of this positive pulse, capacitor 118*b* discharges slowly through the high impedance of resistor 118*a*, thus causing the control grid of circuit 118' to go below cut-off. This generates a positive pulse at the anode of circuit 118' in response to a positive pulse supplied to the control grid of this circuit. However, the output pulse is delayed by approximately the width of the input pulse. The output signal of circuit 118' is supplied to the control grids of sampler circuits 78' and 206'**.

The positive pulses at the anode of buffer 112' are supplied to delay amplifier 114' through a resistance-capacitance network **114*a*—114*b*. Resistor 114*a* has a relatively large value and is returned to a positive potential. Therefore circuit 114' produces positive output pulses which are delayed by approximately the width of the input pulses. These positive pulses are supplied to a second delay network 116' which comprises a second resistor-capacitor coupling network 116*a*—116*b*. Again resistor 116*a* has a relatively large value and is returned to a positive potential so that a further delay is introduced. Circuit 116' is connected to the control grid of a tube 110*c* which shares the anode load impedance of tube 110*a*. The screen grid of the tube 110*c* is returned to either a positive or negative potential through a switch 110*d*. Switch 110*d* connects the screen grid to a negative potential when the circuit is set to encode a signal, and to a positive potential when the signal is set to decode a signal. Therefore, only one of the tubes in circuit 110' can be conducting at a time. The signal appearing across the common anode load impedance will be substantially the same regardless of which tube is conducting except that it will occur later in time if tube 110*c* is conducting than if tube 110*a*** is conducting.

In sampler 206', capacitor 206'' performs essentially the same function as capacitor 78'' in sampler 78' of Fig. 3A. Sampler 206' is supplied with a signal from the output of combining network 82' through cathode follower 86' of Fig. 3A and buffer 208' of Fig. 3C. It will be seen that buffer 208' is a conventional cathode loaded amplifier stage.

The output of sampler circuit 206' is supplied through cathode follower 210' to filter circuit 212'. A switch **214*a* is provided in output circuit 214' to provide means for interrupting the output signal when the circuit is set for encoding. A potentiometer 214*b*** is provided for adjusting the amplitude of the level of the decoded signal.

It will be obvious to those skilled in the art that many changes and modifications may be made in the circuit described above without departing from the spirit and scope of the invention as defined by the hereinafter appended claims. However, the circuit of Figs. 3A, 3B and 3C has been found to operate in a very satisfactory manner and this circuit realizes the stated objects of the invention of reducing to a minimum the circuit elements which are idle when the circuit is either encoding or decoding a signal.

In the light of the foregoing description of certain representative embodiments of the invention, it is in order to state more generally the essential features common to all embodiments thereof. The embodiment of Fig. 2 and all embodiments of similar nature can be described generally as comprising $n$ reference level generators, where $n$ is an integer greater than one. Each generator provides selectively a signal at a first or second amplitude level. A timer means is associated with these reference level generators for controlling the operation thereof. This timer is arranged to set the first reference level generator to provide a signal at a first level, and the remainder of the generators to provide a signal at the second level. This timer is further arranged to reset all of the generators substantially simultaneously and at times spaced by intervals T. A second timer means is associated with all of the generators except the first generator for resetting all of the generators except the first generator to provide a signal at the first level at times following said initial setting times by intervals $$\frac{(2a-b-2)I}{2n}$$

where $a$ is the order number of the generators, $b$ has the value one or zero depending upon whether the circuit is set to decode or code a signal, and I is the duration of the interval ni which a code group is generated. In Fig. 2, for example, $n=4$ and $a=1$ for generator 90, $a=2$ for generator 92, $a=3$ for generator 94 and $a=4$ for generator 96. The term $b$ accounts for the delay introduced by delay means 114 and 116 in the decoding condition.

The output signals of the reference generators are combined so that the contribution of each generator to the output signal is approximately equal to $2^{n-a}$. In the system of Fig. 2, $a=4$ for generator 96. Therefore the contribution of this reference generator to the output signal would be $2^0$ or 1. Similarly, $a=3$ for reference generator 94. The output signal contributed by this generator is $2^1$ or 2. The signal to be encoded is sampled at a time following the initial setting time by an interval less than $$\frac{I}{2n}$$

The code signals in each group are separated by intervals of $I/n$. The presence or absence of each pulse in the output will depend upon the relative amplitudes of the reference signal and the sampled signal at the time that the pulse is to appear. Means are provided for individually resetting all of the reference generators at times following the initial setting times by intervals $$\frac{(2a-b)I}{2n}$$

provided that an output pulse is generated at that time. This last-mentioned means is held inoperative with respect to the nth reference generator except when the system is arranged to decode a signal. Finally means are provided for sampling the reference signal between the time the last pulse in a code group occurs and the time the next reset pulse occurs. The relationships mentioned above hold true regardless of the number of pulses in each code group or the timing means employed. Also these relationships hold true when $I=T$ and when I is less than T.

Having now described our invention we claim:

1. A combined coder and decoder comprising $n$ reference level generators, where $n$ is any integer greater than 1, each generator being arranged to provide selectively signals at a first or a second level, a first timer means associated with said reference level generators for controlling the operation thereof, said first timer means being arranged to set at times separated by intervals T the first reference level generator to provide a signal at said first level and the remainder of said reference level generators to provide signals at said second level, said first timer means being further arranged to reset selectively said remainder of said reference level generators to said first level at times following said initial setting times by intervals $$\frac{(2a-b-2)I}{2n}$$

where $a$ has an integer value between 1 and $n$ designating the order number of the reference generators starting with the highest weight generator and I is the duration of the time interval within which a code group is to be generated, means associated with said first timer means for selectively controlling the operation of said first timer means to cause $b$ to have selectively the value approximately zero or approximately 1, means for combining the output signals of said $n$ reference level generators, the combination of said $n$ generators and said combining circuit being so constructed and arranged that the contribuiton of each reference level generator to the combined output signal is either $k$ or $k+2^{(n-a)}$, where $k$ is an arbitrary constant having the same value for all generators, means responsive to an applied signal for sampling the signal to be coded, said first timer means being arranged to supply a signal to said first sampling means at times separated by said intervals T, said last-mentioned times following the initial setting times of said reference generators by an interval less than $$\frac{I}{2n}$$

said first sampling means being arranged to have a substantially constant amplitude in the intervals between successive signals supplied thereto from said first timer means, means for comparing the relative amplitudes of the output signal of said first sampling means and the output signal of said combining circuit, the output signal of said comparing means having an amplitude in a first range for differences of one polarity between said amplitudes of the compared signals and an amplitude in a different range for differences of the opposite polarity, a code generating means associated with said amplitude compared means and said first timer means, said first timer means being arranged to supply pulse signals to said code generator means at times separated by intervals $$\frac{I}{n}$$

said pulses being so phased that a pulse occurs between each signal actuating said sampling means and the next occurring reset signal to said reference level generators, said code generating means being constructed and arranged to pass said pulses only during intervals in which the output signal from said comparator means has an amplitude in said first range, second timer means, means for selectively connecting the output of said code generating means or a source of signals to be decoded to the input of said second timer means, said second timer means being arranged to supply an output signal only at such times as a pulse signal is supplied to the input thereof, said second timer means being arranged to reset at selected times each of said reference level generators except the last to provide signals at said second level, said selected times being the times following said initial setting times by intervals $$\frac{(2a-b)I}{2n}$$

at which a pulse signal is supplied to the input of said second timer means, means operative during intervals in which said first timer means is controlled to cause $b$ to have the value 1 for causing said second timer means to reset at selected times said $n$th reference level generator to provide a signal at said second level, said last-mentioned selected times being the times following said reset times by intervals $$\left(1-\frac{b}{2n}\right)I$$

at which a pulse signal is supplied to the input of said second timer means, second means responsive to an applied signal for sampling the amplitude level of the signal at the output of said combining means, said first timer means being arranged to supply a signal to said second sampling means at times following said initial setting times by an interval at least $$I\left(1-\frac{1}{2n}\right)$$

said last-mentioned signals being supplied at times preceding said initial setting times during intervals in which said first timer means is controlled to cause $b$ to have the value 1, said second sampling means being arranged to have a substantially constant output in the intervals between successive sampling signals supplied thereto.

2. A combined coder and decoder comprising $n$ reference level generators, where $n$ is any integer greater than 1, each generator being arranged to provide selectively a signal at a first or a second amplitude level, a first timer means associated with said reference level generators for controlling the operation thereof, said first timer means being arranged to set the first reference level generator to provide a signal at said first level and the remainder of said generators to provide a signal at said second level, the setting of all said generators occurring substantially simultaneously and at times spaced by intervals T, second timer means associated with all said generators except said $n$th generator for resetting all said generators except said first generator to provide a signal at said first level at times following said initial setting times by intervals $$\frac{(2a-b-2)I}{2n}$$

where $a$ is an integer corresponding to the order number of the generators starting with the highest weight generator and I is the duration of the time interval within which a code group is to be generated, means for controlling at least one of sait timer means to cause $b$ to have selectively a value approximately zero or approximately 1, means for combining the output signals of said $n$ reference level generators, the combination of said $n$ generators and said combining circuit being so arranged that effectively the two output signals from each generator are $k$ and $k+2^{(n-a)}$, where $k$ is an arbitrary constant having the same value for all generators, means responsive to an applied signal for sampling the signal to be coded, said first timer means being arranged to supply a signal to said sampling means at times separated by said intervals T, said last-mentioned times following the initial setting times of said reference generators by an interval less than $$\frac{I}{2n}$$

said first sampling means being arranged to have a substantially constant amplitude output signal in the intervals between successive signals supplied thereto from said first timer means, means for comparing the relative amplitudes of the output signal of said first sampling means and the output signal of said combining circuit, the output signal of said comparing means having an amplitude in a first range for differences of one polarity between said amplitudes of the compared signals and an amplitude in a different range for differences of the opposite polarity, means associated with said amplitude comparing means for generating a coded series of pulses, said generator being so arranged that the times at which a pulse may be generated are separated by intervals $$\frac{I}{n}$$

said times being such that one of said times occurs between the time a signal actuates said sampling means and the time of the next occurring reset signal to said reference level generators, said code generating means providing pulses at said times only in response to a signal from said comparing means in said first amplitude range, third timer means having $n$ outputs, each of said outputs being connected to a corresponding reference generator, said third timer means being so arranged that a signal at one of said outputs resets the reference generator associated with said output to provide signals at said second level, the times at which said resetting may occur following said initial setting times by intervals $$\frac{(2a-b)I}{2n}$$

said third timer means being arranged to reset a reference generator only upon the occurrence of a pulse at the input thereof, a source of signals to be decoded, means for selectively connecting the output of said coding means or said source of signals to be decoded to the input of said third timer means, means operative during the intervals in which said first and second timer means are controlled to cause $b$ to have the value zero to cause the third timer means to be ineffective to reset the $n$th reference generator, second means responsive to an applied signal for sampling the amplitude level of the signal at the output of said combining means, said first timer means being arranged to supply a signal to said second sampling means at times following said initial setting times by an interval at least $$I\left(1-\frac{1}{2n}\right)$$

said last-mentioned signals being supplied at times preceding said initial setting times during intervals in which said first and second timer means are controlled to cause $b$ to have the value 1, said second sampling means being arranged to have a substantially constant output in the intervals between successive sampling signals supplied thereto.

3. A combined coder and decoder comprising $n$ substantially identical reference level generators, where $n$ is an integer greater than 1, each generator being arranged to provide selectively a signal at a first or a second amplitude level, a first timer means associated with said reference level generators for controlling the operation thereof, said first timer means being arranged to set the first reference level generator to provide a signal at said first level and the remainder of said generators to provide a signal at said second level, the setting of all said generators occurring substantially simultaneously and at times spaced by intervals T, second timer means associated with all said generators except said first generator for resetting all generators except said first generator to provide a signal at said first level at times preceding said initial setting times by intervals $$\frac{(2a-b-2)I}{2n}$$

where $a$ is an integer corresponding to the order number of a generator when numbered in sequence and I is the duration of the interval within which a code group is to be generated, means for controlling at least one of said timer means to cause $b$ to have selectively a value approximately zero or approximately 1, means for combining the output signals of said $n$ reference level generators, said combining means comprising a common impedance having a first terminal returned to a point of fixed reference potential and $n$ individual impedances connecting the respective outputs of said $n$ generators to a second terminal of said common impedance, the ratio of the impedance of each of said individual impedances to the impedance of said common impedance being approximately $2^{(a-1)}$ where the value $a$ for each individual impedance is the number of the generator with which it is associated, means responsive to an applied signal for sampling the signal to be coded, said first timer means being arranged to supply a signal to said sampling means at times separated by intervals T, said last-mentioned times following the initial setting times of said reference generators by an interval less than $$\frac{I}{2n}$$

said first sampling means being arranged to have a substantially constant amplitude output signal in the intervals between successive signals supplied thereto from said first timer means, means for comparing the relative amplitudes of the output signal of said first sampling means and the signal appearing across said common impedance, the output signal of said comparing means having an amplitude in a first range for differences of one polarity between said amplitudes of the compared signals and an amplitude in a different range for differences of the opposite polarity, means associated with said amplitude comparing means for generating a coded series of pulses, said generator being so arranged that the times at which a pulse may be generated are separated by intervals $$\frac{I}{n}$$

said times being such that one of said times occurs between the time a signal actuates said sampling means and the time of the next occurring reset signal to said reference level generators, said code generating means providing pulses at said times only in response to a signal from said comparing means in said first amplitude range, third timer means having $n$ outputs, each of said outputs being connected to a corresponding reference generator, said third timer means being so arranged that a signal at one of said outputs resets the reference generator associated with said output to provide signals at said second level, the times at which said resetting may occur following said initial setting times by intervals $$\frac{(2a-b)I}{2n}$$

said third timer means being arranged to reset a reference generator only upon the occurrence of a pulse at the input thereof, a source of signals to be decoded, means for selectively connecting the output of said coding means or said source of signals to be decoded to the input of said third timer means, means operative during the intervals in which said first and second timer means are controlled to cause $b$ to have the value zero to cause the third timer means to be ineffective to reset the $n$th reference generator, second means responsive to an applied signal for sampling the amplitude level of the signal at the output of said combining means, said first timer means being arranged to supply a signal to said second sampling means at times following said initial setting times by an interval at least $$I\left(1-\frac{1}{2n}\right)$$

said last-mentioned signals being supplied at times preceding said initial setting times during intervals in which sad first and second timer means are controlled to cause $b$ to have the valve 1, said second sampling means being arranged to have a substantially constant output in the intervals between successive sampling signals supplied thereto.

4. A combined coder and decoder comprising $n$ bi-stable circuits having substantially identical output signals, each bi-stable circuit having an output which may be caused to have selectively either a high or a low potential, a first timer means associated with said bi-stable circuits for controlling the operation thereof, said first timer means being arranged to set the first bi-stable circuit to provide a signal at said low level and the remainder of said bi-stable circuits to provide a signal at said high level, the setting of all said bi-stable circuits occurring substantially simultaneously and at times spaced at intervals T, second timer means associated with all said bi-stable circuits except said first bi-stable circuit for resetting all said bi-stable circuits except said first bi-stable circuit to provide a signal at said low level at time following said initial setting times by intervals $$\frac{(2a-b-2)I}{2n}$$

where $a$ is an integer corresponding to a particular bi-stable circuit if said bi-stable circuits are numbered in sequence from 1 to $n$, means for controlling at least one of said timer means to cause $b$ to have selectively a value approximately zero or approximately 1, means for combining the output signals of said $n$ bi-stable circuits, said combining means comprising a common impedance having a first terminal returned to a point of fixed reference potential and $n$ individual impedances connecting the respective outputs of said $n$ bi-stable circuits to a second terminal of said common impedance, the ratio of the impedance of each of said individual impedances to said common impedance being approximately $2^{(a-1)}$ where the value of $a$ for each individual impedance is the number of the bi-stable circuit with which it is associated, means responsive to an applied signal for sampling the signal to be coded, said first timer means being arranged to supply a signal to said sampling means at times separated by intervals T, said last-mentioned times following the initial setting times of said bi-stable circuits by an interval less than $$\frac{T}{2n}$$

said first sampling means being arranged to have a substantially constant amplitude output signal in the intervals between successive signals supplied thereto from said first timer means, means for comparing the relative amplitudes of the output signal of said first sampling means and the signal appearing across said common impedance, the output signal of said comparing means having an amplitude in a first range for differences of one polarity between said amplitudes of the compared signals and an amplitude in a different range for differences of the opposite polarity, means associated with said amplitude comparing means for generating a coded series of pulses, said generator being so arranged that the times at which a pulse may be generated are separated by intervals $$\frac{T}{n}$$

said times being such that one of said times occurs between the time a signal actuates said sampling means and the time of the next occurring reset signal to said reference level generators, said code generating means providing pulses at said times only in response to a signal from said comparing means in said first amplitude range, third timer means having $n$ outputs, each of said outputs being connected to a corresponding bi-stable circuit, said third timer means being arranged selectively to reset said bi-stable circuits to provide signals at said high level, the times at which said resetting may occur preceding said initial setting times by intervals $$\frac{(2a-b)T}{2n}$$

said third timer means being arranged to reset a bi-stable circuit only upon the occurrence of a pulse at the input thereof, a source of signals to be decoded, means for selectively connecting the output of said coding means or said source of signals to be decoded to the input of said third timer means, means operative during the intervals in which said first and second timer means are controlled to cause $b$ to have a value zero to cause the third timer means to be ineffective to reset the said $n$th bi-stable circuit, second means responsive to an applied signal for sampling the amplitude level of the signal at the output of said combining means, said first timer means being arranged to supply a signal to said second sampling means at times separated from said initial setting times by an interval less than T, said last-mentioned signals being supplied at times preceding said initial setting times during intervals in which said first and second timer means are controlled to cause $b$ to have the value 1, said second sampling means being arranged to have a substantially constant output in the intervals between successive sampling signals supplied thereto.

5. A combined coder and decoder comprising $n$ reference level generators having substantially identical outputs, where $n$ is an integer greater than 1, each generator being arranged to provide selectively a signal at a first or a second amplitude level, a first timer means associated with said reference level generators for controlling the operation thereof, said first timer means being arranged to set the first reference level generator to provide a signal at said first level and the remainder of said generators provide a signal at said second level, the setting of all said generators occurring substantially simultaneously and at times spaced by intervals T, second timer means associated with all said generators except said first generator for resetting all said generators except said first generator to provide a signal at said first level at times following said initial setting times by intervals $$\frac{(2a-b-2)I}{2n}$$

where $a$ is an integer corresponding to the order number of a particular generator when said generators are numbered in sequence from 1 to $n$, means for controlling at least one of said timer means to cause $b$ to have selectively a value approximately zero or approximately 1, means for combining the output signals of said $n$ reference level generators, said combining means comprising a common impedance having a first terminal returned to a point of fixed reference potential and $n$ individual impedances connecting the respective outputs of said $n$ generators to a second terminal of said common impedance, the ratio of the impedance of each of said individual impedances to said common impedance being approximately $2^{(a-1)}$ where the value of $a$ for each individual impedance is the number of the generator with which it is associated, means responsive to an applied signal for sampling the signal to be coded, said first timer means being arranged to supply a signal to said sampling means at times separated by intervals T, said last-mentioned times following the initial setting times of said reference generators by an interval less than $$\frac{T}{2n}$$

said first sampling means being arranged to have a substantially constant amplitude output signal in the intervals between successive signals supplied thereto from said first timer means, means for comparing the relative amplitudes of the output signal of said first sampling means and the signal appearing across said common impedance, the output signal of said comparing means having an amplitude in a first range for differences of one polarity between said amplitudes of the compared signals and an amplitude in a different range for differences of the opposite polarity, a first coincidence circuit associated with said amplitude comparing means for generating a coded series of pulses, said first coincidence circuit being arranged to pass a signal from the input to the output thereof only in response to a signal from said comparing means in said first amplitude range, means for supplying a series of pulses separated by intervals $$\frac{T}{n}$$

to the input of said first coincidence circuit, said pulses being so timed that a pulse occurs between the time a signal actuates said sampling means and the time of the next occurring reset signal to said reference level generators, a second coincidence means having $n$ outputs, each of said outputs being connected to a corresponding reference generator, means arranged to condition said second coincidence means to permit the passage of a signal from the input thereof to each of the respective outputs at times following said initial setting times by intervals $$\frac{(2a-b)T}{2n}$$

each of said reference generators being arranged to be reset to said second level upon the occurrence of a pulse at the output of said second coincidence means associated therewith, a source of signals to be decoded, means for selectively connecting the output of said first coincidence means or said source of signals to be decoded to the input of said second coincidence means, means operative during the intervals in which said first and said second timer means are controlled to cause $b$ to have the value zero to cause the second coincidence means to be ineffective to reset the $n$th reference generator, second means responsive to an applied signal for sampling the amplitude level of the signal at the output of said combining means, said first timer means being arranged to supply a signal to said second sampling means at times separated from said initial setting times by an interval less than $$\frac{T}{2n}$$

said last-mentioned signals being supplied at times preceding said initial setting times during intervals in which sad first and second timer means are controlled to cause $b$ to have the value 1, said second sampling means being arranged to have a substantially constant output in the intervals between successive sampling signals supplied thereto.

6. A combined coder and decoder comprising $n$ bi-stable circuits, where $n$ is an integer greater than 1, each bi-stable circuit having an output which may be caused to have selectively either a high or a low potential, a first timer means associated with said bi-stable circuits for controlling the operation thereof, said first timer means being arranged to set the first bi-stable circuit to provide a signal at a first of said two potentials and the remainder of said bi-stable circuits to provide a signal at a second of said two potentials, the setting of all said bi-stable circuits occurring substantially simultaneously and at times spaced by intervals T, second timer means associated with all said bi-stable circuits except said first bi-stable circuit for resetting all said bi-stable circuits except said first bi-stable circuit to cause the outputs thereof to be at said first potential, said resetting occurring at times following said initial setting times by intervals $$\frac{(2a-b-2)}{2n}$$

where $a$ is an integer corresponding to the order number of a particular generator in the sequence from 1 to $n$, means for controlling at least one of said timer means to cause $b$ to have selectively a value approximately zero or approximately 1, means for combining the output signals of said $n$ bi-stable circuits, the combination of said $n$ generators and said combining circuit being so arranged that the contribution of each bi-stable circuit to the combined output signal is either $k$ or $k+2^{(n-a)}$ where $k$ is an arbitrary constant having the same value for all bi-stable circuits, means responsive to an applied signal for sampling the signal to be coded, said first timer means being arranged to supply a signal to said sampling means at times separated by said intervals T, said last-mentioned times following the initial setting times of said reference generators by an interval less than $$\frac{T}{2n}$$

said first sampling means being arranged to have a substantially constant amplitude output signal in the intervals between successive signals supplied thereto from said first timer means, means for comparing the relative amplitude of the output signal of said first sampling means and the output signal of said combining circuit, the output signal of said comparing means having an amplitude in a first range for differences of one polarity between said amplitudes of the compared signals and an amplitude in a different range for differences of the opposite polarity, a first coincidence circuit associated with said amplitude comparing means for generating a coded series of pulses, said first coincidence circuit being arranged to pass a signal from the input to the output thereof only in response to a signal from said comparing means in said first amplitude range, means for supplying a series of pulses separated by intervals $$\frac{T}{n}$$

to the input of said first coincidence circuit, said pulses being so timed that a pulse occurs between the time a signal actuates said sampling means and the time of the next occurring reset signal to said reference level generators, $n$ normally blocked gate circuits each associated with a corresponding one of said $n$ bi-stable circuits, means for unblocking said gate circuits in sequence at times following the initial setting times by $$\frac{(2a-b)T}{2n}$$

a source of signals to be decoded, means for selectively connecting the output of said first coincidence means or said source of signals to be decoded to said $n$ gate circuits, each of said bi-stable circuits being arranged to be reset by the output of the gate circuit associated therewith to cause the outputs thereof to be at said second potential, means operative during the intervals in which said first and second timer means are controlled to cause $b$ to have the value zero to hold the $n$th gate circuit in said normally blocked condition, second means responsive to an applied signal for sampling the amplitude level of the signal at the output of said combining means, said first timer means being arranged to supply a signal to said second sampling means at times separated from said initial setting times by an interval less than $$\frac{T}{2n}$$

said last-mentioned signals being supplied at times preceding said initial setting times during intervals in which said first and second timer means are controlled to cause $b$ to have the value 1, said second sampling means being arranged to have a substantially constant output in the intervals between successive sampling signals supplied thereto.

7. A combined coder and decoder comprising means for sampling at selected times a signal to be coded, said sampling means being arranged to provide an output signal the amplitude of which is substantially constant in the intervals between successive sampling pulses, said amplitude being representative of a characteristic at the time of sampling of said signal to be coded, a source of variable amplitude reference potential, said source being so arranged that said reference potential normally decreases in amplitude in a plurality of unequal steps in each interval between successive sampling pulses, each step defining a subinterval of the interval between successive sampling pulses, circuit means for comparing the amplitude of the output signal of said sampling means with the amplitude of said reference potential during more than one subinterval of each interval, said comparison circuit providing a first signal for differences of one polarity between the amplitudes of the compared signals and a second signal for differences of the opposite polarity, means responsive to the output of said comparison circuit for generating a pulse in response to each occurrence of a signal of said first polarity, a source of signals to be decoded, means for selectively connecting the output of said pulse generating means or said source of signals to be decoded to said source of reference potential, said reference potential source being so constructed and arranged that the reference potential is increased in response to a pulse supplied thereto from the circuit connected thereto by an amount greater than the next following normal decrease, and means for sampling the amplitude of said reference potential at times immediately preceding said first-mentioned sampling times.

8. A circuit for generating and/or decoding code groups including $n$ units each occurring within a different one of $n$ successive time intervals, said circuit comprising means for sampling at selected times a signal to be coded, said sampling means being arranged to provide an output signal the amplitude of which is substantially constant in the intervals between successive sampling pulses, said amplitude being representative of a characteristic at the time of sampling of said signal to be coded, a source of variable amplitude reference potential, said source being so arranged that said reference potential normally has an amplitude $K+2^{(n-a)}$ where K is an arbitrary constant and $a$ is the order number of the time interval during which a unit of the coded output is generated, circuit means for comparing the amplitude of the output signal of said sampling means with the amplitude of the reference potential at times during each of $n$ intervals, said comparison circuit providing a first signal for differences of one polarity between the amplitudes of the compared signals and a second signal for differences of the opposite polarity, means responsive to the output of said comparison circuit for generating a code pulse in response to each occurrence of a signal of said first polarity, a source of signals to be decoded, means for selectively connecting the output of said pulse generating means or said source of signals to be decoded to said source of reference potential, said reference potential source being so constructed and arranged that the reference potential increases rather than decreases following each interval within which a pulse is generated by an amount equal to the normal decrease, means operative in response to signals to be decoded for increasing the amplitude of said reference level by one unit upon the occurrence of a pulse in the interval in which $a$ equals $n$, and means for sampling the amplitude of said reference potential in the interval during which $a$ is equal to $n$ at a time following said last-mentioned increase, if any, in said reference potential.

9. A circuit for generating and/or decoding code groups including $n$ units each occurring within a different one of $n$ successive time intervals, said circuit comprising means for sampling at selected times a signal to be coded, a source of reference potential having a variable amplitude normally equal to $K+2^{(n-a)}$ where K is an arbitrary constant and $a$ is the order number of the time interval during which a unit of the coded output is generated, circuit means for comparing the amplitude of the output signal of said sampling means with the amplitude of said reference potential for each of said $n$ intervals, means responsive to said comparison circuit for generating a code pulse in response to a difference in the relative amplitudes of a first sense, a source of signals to be decoded, means for selectively connecting the output of said pulse generating means or said source of signals to be decoded to said source of reference potential, said source of reference potential being so constructed and arranged that the reference potential increases rather than decreases following each interval within which a pulse is generated by an amount equal to the normal decrease, means operative in response to signals to be decoded for increasing the amplitude of the reference level by one unit upon the occurrence of a pulse in the final interval, and means for sampling the amplitude of said reference potential in the final interval at a time following said last-mentioned increase, if any, in said reference potential.

10. A circuit for generating and/or decoding code group including $n$ units each occurring within a different one of $n$ successive time intervals, said circuit comprising means for sampling at selected times a signal to be coded, a source of reference potential which has an initial amplitude equal to $K+(2^{n-1}-1)$ and which changes in steps by $\pm 2^{n-(a+1)}$, where K is an arbitrary constant and $a$ is the order number of the interval in which the change takes place, circuit means for comparing the amplitude of the output signal of said sampling means with the amplitude of said reference potential at times during each of said $n$ intervals, means responsive to the output of said comparison circuit for generating a code pulse in response to a difference in the relative amplitudes of a first sense, a source of signals to be decoded, means for selectively connecting the output of said pulse generating means or said source of signals to be decoded to said source of reference potential, said source of reference potential being arranged to cause a change in level of one sense in the next following interval in response to the occurrence of a code pulse and in the opposite sense in the absence of a code pulse, means operative in response to signals to be decoded for increasing the amplitude of the reference level by one unit upon the occurrence of a pulse in the final interval, and means for sampling the amplitude of said reference potential in the final interval at a time following said last-mentioned increase, if any, in said reference potential.

References Cited in the file of this patent

UNITED STATES PATENTS

| | | |
|---|---|---|
| 2,449,467 | Goodall | Sept. 14, 1948 |
| 2,533,493 | Mitchell | Dec. 12, 1950 |
| 2,592,061 | Oxford | Apr. 8, 1952 |
| 2,592,308 | Meachem | Apr. 8, 1952 |
| 2,610,295 | Carbrey | Sept. 9, 1952 |
| 2,658,139 | Abate | Nov. 3, 1953 |
| 2,672,517 | Boughtwood | Mar. 16, 1954 |
| 2,692,943 | Reid | Oct. 26, 1954 |